United States Patent [19]

Tufts et al.

[11] Patent Number: 5,567,195

[45] Date of Patent: Oct. 22, 1996

[54] METHOD AND APPARATUS FOR GRINDING BARS

[75] Inventors: Arthur W. Tufts, Crete; Mark Jellema, Lynwood; Blair Haddle, Landin, all of Ill.

[73] Assignee: Tufts Grinding, Inc., South Chicago Heights, Ill.

[21] Appl. No.: 370,620

[22] Filed: Jan. 10, 1995

[51] Int. Cl.⁶ .................................................. B24B 49/04
[52] U.S. Cl. ............................. 451/11; 451/21; 451/182; 451/241; 451/245; 451/397
[58] Field of Search ........................... 451/11, 14, 21, 451/72, 182, 241, 245, 385, 397

[56] References Cited

U.S. PATENT DOCUMENTS

| | | | |
|---|---|---|---|
| 2,979,869 | 4/1961 | Birleson et al. | 451/245 X |
| 4,018,011 | 4/1977 | Whittenberg | 451/245 X |
| 4,275,527 | 6/1981 | Daito et al. | 451/245 |
| 4,570,387 | 2/1986 | Unno et al. | 451/21 X |
| 4,580,370 | 4/1986 | Smith | 451/245 X |
| 4,934,105 | 6/1990 | Sigg | 451/21 X |

*Primary Examiner*—Timothy V. Eley
*Attorney, Agent, or Firm*—Dressler, Goldsmith, Milnamow & Katz, Ltd.

[57] ABSTRACT

A method and apparatus for initially taking an individual bar from a supply of bars and placing it on an entry conveyor while preventing movement of the remaining bars. Other mechanisms are provided for adjusting the entry conveyor to accommodate the diameter of the bars to be ground. The individual bars to be ground are initially moved into position between a regulating wheel and a grinding wheel. The regulating wheel maintains the bar against the grinding wheel and the movement of the regulating wheel toward the grinding wheel during the grinding action is sensed by an encoder device. The encoder device in turn signals to a servomotor to move the grinding wheel an amount equal to but in the opposite direction to the regulating wheel to compensate for the wearing of the grinding wheel. The regulating wheel is set at a slight angle relative to the bar to impose a vector force that moves the bar through the grinding station to the exit conveyor from where the bar is subsequently moved to a holding area.

6 Claims, 3 Drawing Sheets

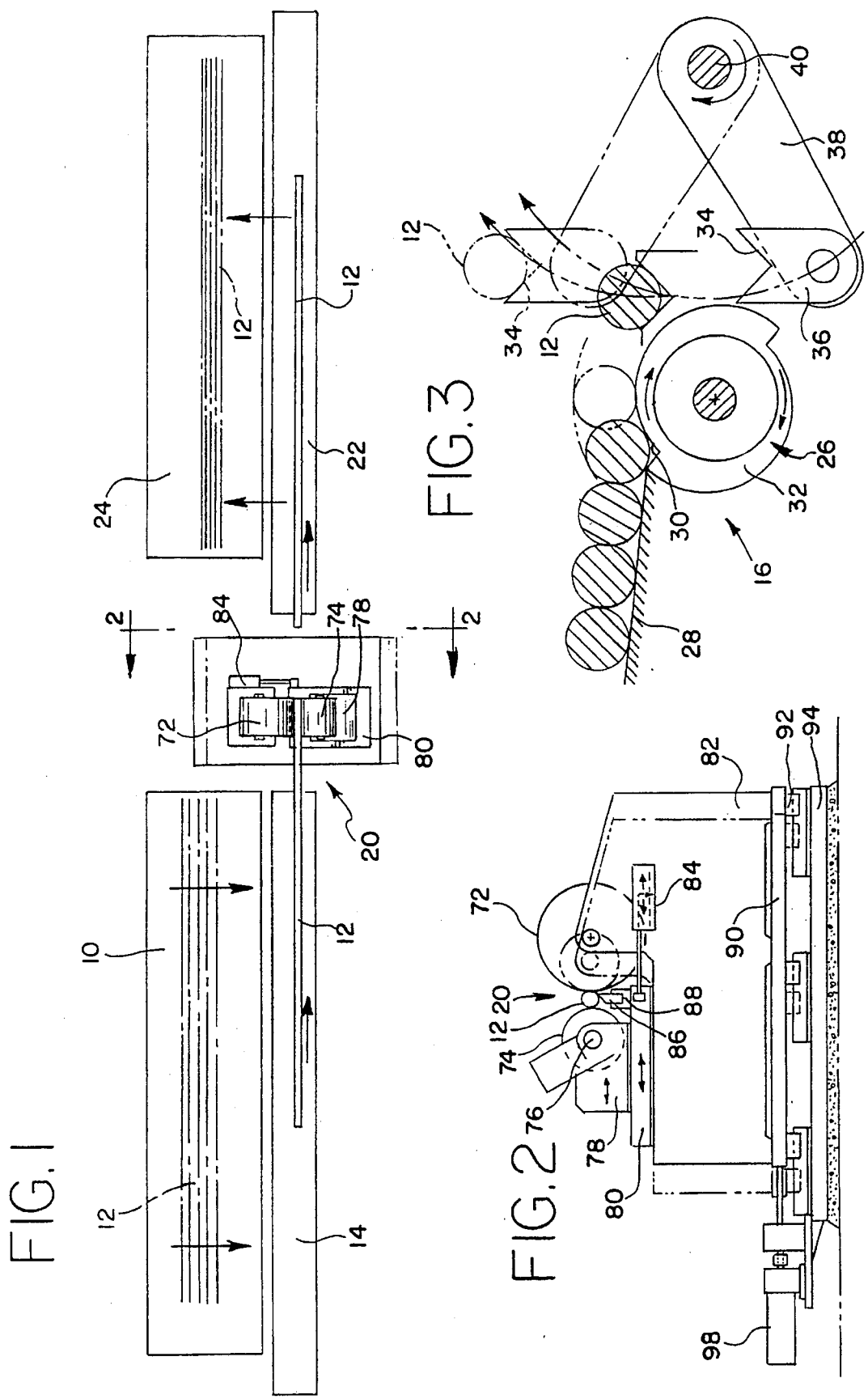

METHOD AND APPARATUS FOR GRINDING BARS

BACKGROUND OF THE INVENTION

This invention relates to a system for automatically taking individual elongated cylindrical bars from a supply of bars located on a holding table, longitudinally supporting the bars, and feeding them into a grinding station where the bar is ground to the requisite diameter and finish. The bar is automatically driven through the grinding station during the grinding action to an exit conveyor and then moved to a storage area.

Systems of the aforementioned type conventionally include a mechanism for placing individual bars on a support device and then longitudinally directing the bars into position to be ground. In the grinding station, the grinding wheel is fixed in position and the bar support and conveying mechanism is movable to permit transverse movement of the bar to be ground into position against a fixed grinding wheel.

It can be appreciated that this is a high labor-intensive method of operation since operators must be constantly available to move the bars against a grinding wheel to accommodate wearing of the grinding wheel. In view of the typical extended length of the bars to be ground, this method of operation requires several operators in order to insure the bars are located in the proper position and orientation to be accurately ground. Also, the handling of different diameter bars and insuring that the bars are individually fed from the holding area and suitably supported during the grinding action requires an inordinate amount of man power, which, if it can be avoided, make for a more speedy, efficient, and less costly system.

It can be appreciated that if a system is provided to automate the introduction of individual bars onto a support, and the support can be readily adjusted to longitudinally support bars of varying diameter, a more efficient system would be provided. Of greater importance yet in the grinding field would be to provide the grinding industry with a system that will automatically compensate for the wear of the grinding wheel during the grinding action. Such a system would be a substantial advance in the art since this would dramatically improve the speed and accuracy of the grinding action while reducing the man power required and thus lower the operating cost.

SUMMARY OF THE INVENTION

In accordance with the present invention, there is provided a novel mechanism for taking a single bar from a supply of bars and placing it onto a longitudinal support. The mechanism controls movement of the balance of the bars from the holding area and the support can be adjusted to accommodate bars of varying diameters.

Dealing initially with the entry area of the grinding system, the system must be capable of taking a single bar from a plurality of bars and placing it on a support serving as an entry conveyor from where it is moved into the grinding area. To this end, there is provided an escapement device which will receive an individual bar from a holding table and move the bar onto a longitudinal support device consisting of a plurality of spaced pairs of holders which pairs of holders are located at 90 degrees relative to each other. The escapement device prevents any additional bars from moving off the holding table until the escapement device is again actuated to place another bar on the longitudinally spaced supports.

In view of the fact that bar lengths of up to 30 feet and of varying diameters may be ground, it is important that there be a single, yet efficiently operated mechanism for adjusting the bar supports to accommodate different size bars throughout the length thereof. A novel single-handle mechanism is provided which functions to adjust the position of the longitudinally spaced supporting devices. This device includes individual ball supports that are mounted on parallel bars, the positions of which are adjusted by the movement of eccentric shafts.

A major novel feature of the instant invention is to provide a grinding station wherein mechanisms are provided in order to automatically accommodate wear of the grinding wheel during the grinding action. The novel system is generally referred to as a centerless grinding system capable of maintaining a fixed longitudinal centerline of the workpiece throughout the production run while compensating for wearing away of the grinding wheel, and to this end, it is necessary that the grinding wheel be moved rather than the bar.

To compensate for grinding wheel wear, the grinding station consists of a movable platform on which the grinding wheel is mounted whereby the grinding wheel can be moved relative to the stationary base of the grinding machine. In a typical situation a new grinding wheel having a 24" diameter will be used until it is ground down to a 15" diameter wheel.

In the grinding station, the bar is located between a regulating wheel and a grinding wheel, which regulating wheel constantly biases the bar against the grinding wheel with the longitudinal centerline of the bar remaining fixed. The regulating wheel is located on a movable platform on which is also located the regulating wheel motor.

An encoder mechanism, including a laser device is used to sense the diameter of the bar and also functions to sense the movement of the regulating wheel relative to the grinding wheel during the grinding action. A computer system is provided as part of the encoder mechanism which senses the movement of the regulating wheel and functions to send a signal to a servomotor that moves the platform on which the grinding wheel is located an amount equal to that of the regulating wheel in the opposite direction to that of the regulating wheel to accomplish the requisite grinding action. The regulating wheel is located on a first sliding member that is movable relative to a lower slidable member that in turn is movable relative to the main platform of the grinding machine. The grinding machine is located on a mounting plate which is supported between linear roller bearings to facilitate ready movement thereof by the computer-controlled servomotor drive. The movements of the regulating wheel and grinding wheel are extremely small. They range from a few ten thousands of an inch to a few one thousands of an inch. Therefore, the actual movement of the regulating wheel and grinding wheel is virtually continuous and uninterrupted and not perceivable to the eye.

It is a principle object of this invention to provide a series of mechanisms wherein the bars can be longitudinally supported and can be readily moved into the grinding area where the grinding machine can be moved to grind the bar to the requisite diameter and also act to move the bar longitudinally onto an exit conveyor for further disposition.

BRIEF DESCRIPTION OF THE DRAWINGS

These and other objects of the invention will be more fully understood upon consideration of the following description of the accompanying drawings, in which FIG. 1 is a plan view of the grinding system consisting of a holding table on which are located a plurality of longitudinal bars, which bars are to be disposed onto an entry conveyor, an intermediate grinding station, an exit conveyor for receiving the bars after they are ground, and a storage area;

FIG. 2 is a side elevation view of the grinding station showing the adjustability of the regulating wheel and grinding wheel;

FIG. 3 is a partial sectional view of an escapement device for individually feeding bars to the entry conveyor;

DESCRIPTION OF A PREFERRED EMBODIMENT

Figure 5:
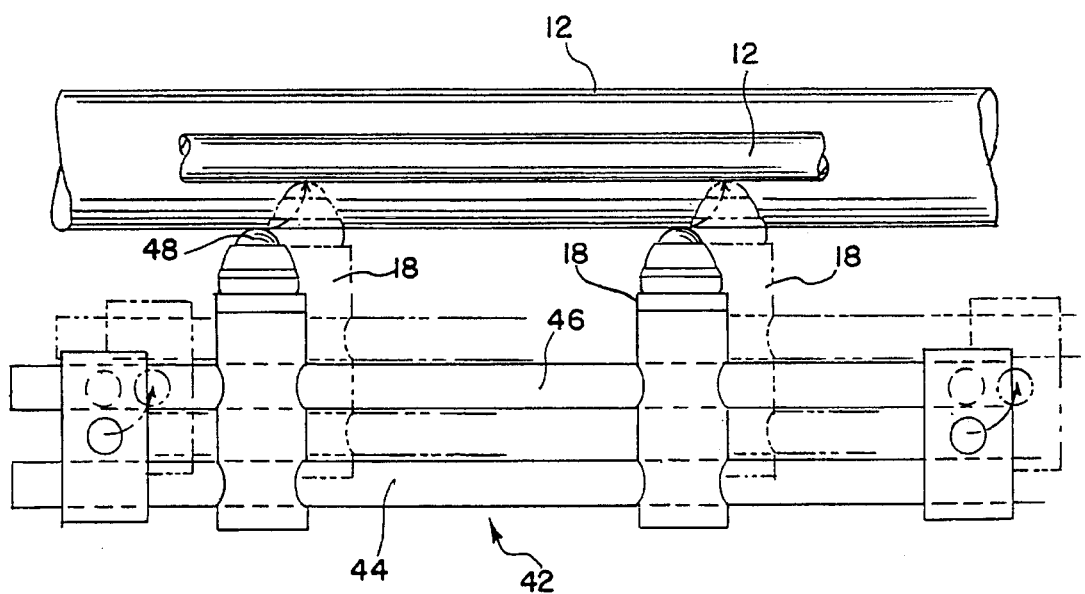
FIG. 5 is a longitudinal view showing the spaced holding supports for the bars.

Referring first to FIG. 1, there is shown a holding table 10 on which are located a plurality of bars 12. The bars 12 are individually fed to the entry conveyor 14 by an escapement mechanism 16 shown in FIG. 3. The individual bars 12 located on the entry conveyor 14 are supported by a plurality of bar holders 18 which are longitudinally spaced as shown in FIG. 5 to support the bars 12 in position as they are being moved into engagement with the grinding machine assembly 20 and moved from the entry conveyor 14 past the grinding machine 20 onto the exit conveyor 22. The bars are then moved from the exit conveyor 22 into the holding area 24.

To follow the orderly process through applicant's novel system, we will first turn to FIGS. 3 through 6 which illustrate the mechanisms for taking an individual bar 12 from a bar supply and disposing said bar on longitudinally spaced bar holders 18 which retain the bar in the desired position during the grinding action.

Figure 4:
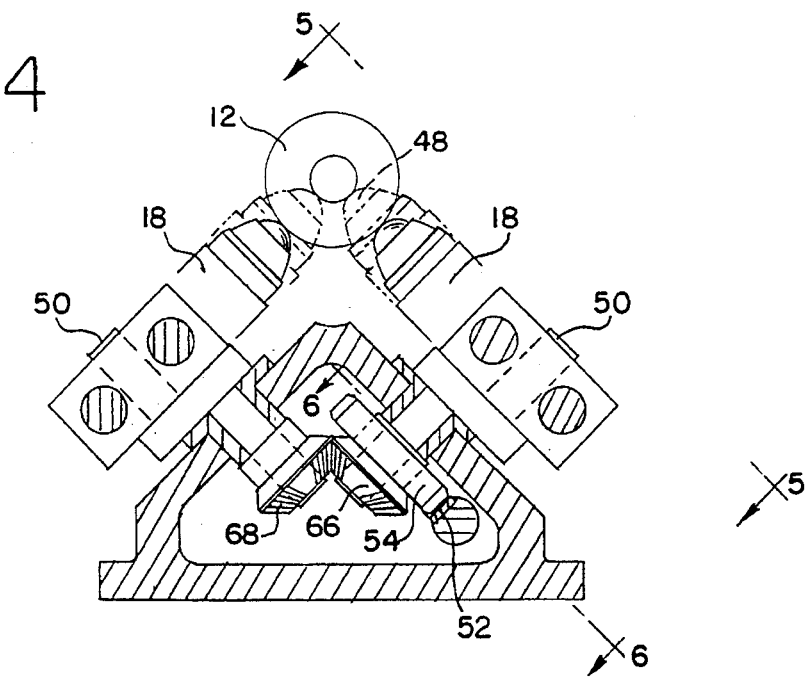
FIG. 4 is a side cross-sectional view of the support mechanism for the bars.

Referring first to FIG. 3, there is illustrated the escapement mechanism 16 whereby the individual bars 12 are moved from the holding table 10 onto the entry conveyor 14 illustrated in schematic form in FIGS. 4 and 5.

The escapement mechanism 16 consists of a plurality of longitudinally spaced rotary eccentric stepped wheels 26 that receive an individual bar from the inclined surface 28 on which a plurality of bars 12 are located. A single bar 12 fits into a V-shaped receiving slot 30 defined by wheels 26 and when the stepped wheels 26 having the cam surface 32 are rotated approximately 180°, a bar 12 is moved onto the spaced fixed V-slots forming part of table 10. A plurality of longitudinally spaced arms 38 have tulip-shaped members including V-shaped slots 34 secured to their ends. The longitudinally spaced arms 38 are fixed to a rotating shaft 40. As can be seen in FIG. 3, when the stepped wheels 26 are moved in a clockwise direction, a first bar 12 is moved onto the V-shaped slots 34 and the cam surfaces 32 prevents any additional bars from moving off the inclined surface 28. The arms 38 are then rotated, which carries the pickup members 36 through approximately 180° to move a bar 12 onto the entry conveyor as illustrated in FIGS. 4 and 5. The rotary arms 38 turn with the escapement device. There is a 2:1 chain drive running from rotary arm shaft 40 to the drive shaft for the escapement mechanism 16. The result is one-half revolution of the escapement wheel for each full revolution of the rotary arms. As illustrated, the device is capable of escapement of bars ranging from 1" to 3" in diameter. If it would be necessary to accommodate a wider range of sizes, the shape of the wheel can be modified to incorporate any number of eccentric steps.

Referring now to FIGS. 4 and 5, it is noted that the bars 12 must be accurately positioned and retained on the entry conveyor 14 during the feeding movement of the bar into the grinding machine 20.

Also, the support roller assembly must be readily adjustable since both productivity and quality is dependant on the speed and accuracy with which these adjustments are made. While the system to be described is particularly important with respect to the centerless grinding of bar stock due to the necessity of proper support and alignment with respect to the grinding system, it is also applicable to any machine tool that processes cylindrical work which must be supported by a loader or conveyor. It is especially advantageous where precise location of either or both the vertical and horizontal centerline is required to remain fixed over a range of diameters of the work. This includes straighteners, screw machines, lathes, etc., as well as grinding machines disclosed in this application. To this end, there is provided a conveyor adjustment and support mechanism 42 that consists of a plurality of pairs of the aforementioned spaced bar holders 18. The pairs of holders 18 are located at a 90° angle relative to each other (see FIG. 4) to provide the requisite support for the bars supported thereon. The bar holders are connected to a pair of spaced parallel shafts 44, 46. Each holder includes at their end freely mounted support rollers 48. The pairs of parallel bars 44, 46 are connected to an eccentric shaft 50 which when rotated varies the position of the bar holders to accommodate different diameter shafts. As shown specifically in FIG. 4, the rotation of the shafts 50 automatically positions the pairs of the bar holders 18 to the requisite position as required by the diameter of the bar to be supported.

Figure 6:
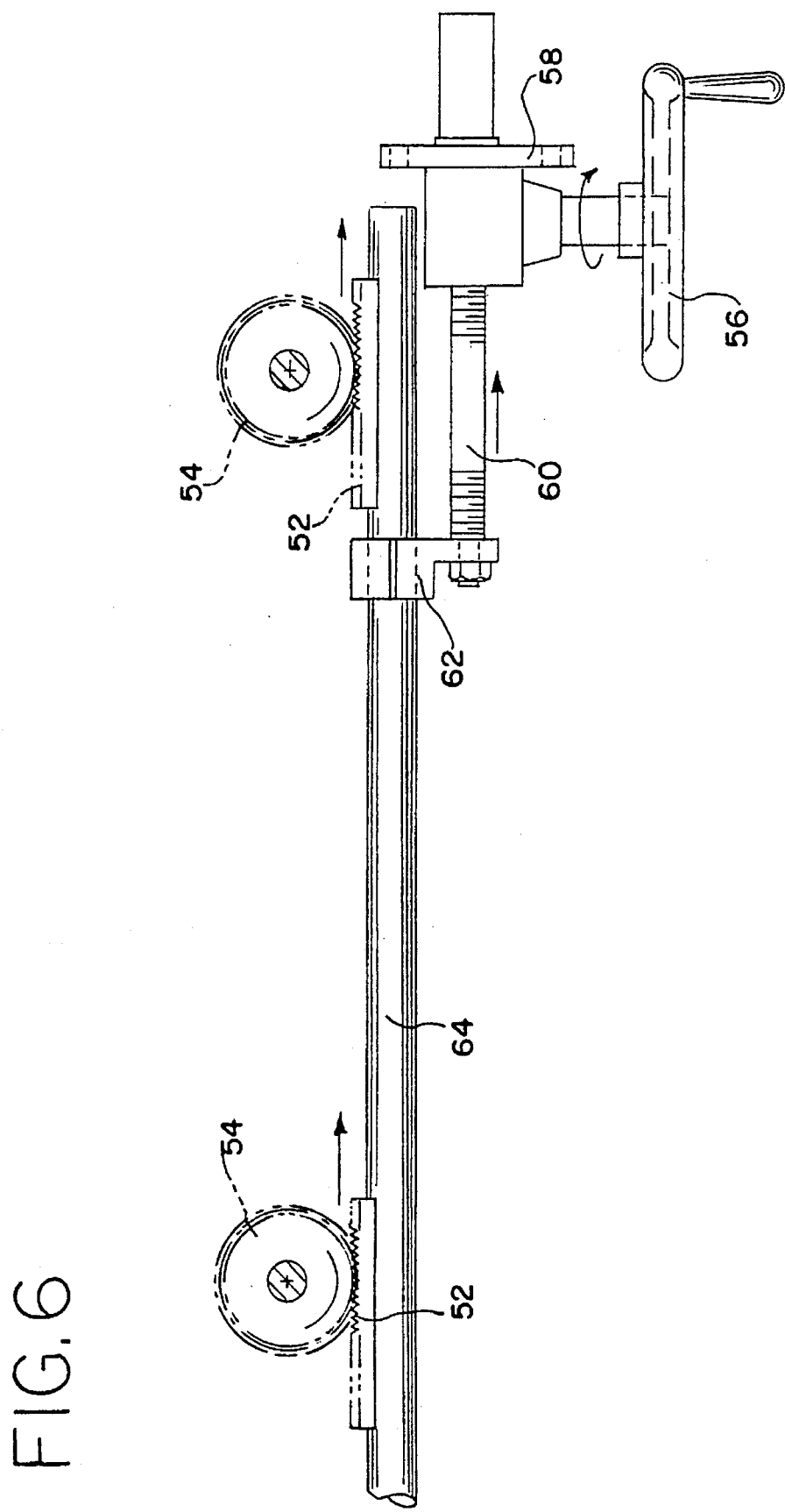
FIG. 6 is a longitudinal view showing the mechanism for individually adjusting the position of the bar supports with a single handle mechanism.

The shafts 50 are rotated to adjustably position the bar holders 18 by spaced rack gears 52 10 which engage spur gears 54. As shown in FIG. 6, there is provided a hand wheel 56 which when rotated moves a worm gear screw jack 58 to move a shaft 60 in a longitudinal direction. The shaft 60 is connected through a connecting clamp 62 to the rack gear rod 64. Thus, as the hand wheel 56 is rotated, the shaft 60 is longitudinally moved to move the rack gears 52 that are engaged with spur gears 54. The rotation of the spur gears 54 then moves the eccentric shafts 50 to adjust the position of the bar holders 18. The pairs of angled bar holders 18 are interconnected through the action of the engaged bevel gears 66, 68 and thus the movement of the rack gears 52 moves the spur gears 54 to move the angularly displaced bar holders the requisite amount.

With a bar being located on the spaced holders 18 the bar is then moved into position in the grinding station 70 of the grinding machine assembly 20 where it is ground to the requisite diameter. As previously discussed, prior centerless grinding systems required that the entry conveyor, workpiece, and regulating wheel be regularly advanced toward the grinding wheel to compensate for grinding wheel wear. Consequently, the longitudinal centerline of the workpiece is displaced laterally during the production run and cannot remain fixed. Applicants novel system has two primary advantages over such previously used systems. First, the workpiece support structure and parts loading mechanism can remain fixed and rigid without the necessity of any mechanism to accommodate lateral adjustment. Secondly, once the initial set-up is obtained and the undercarriage system is engaged, proper alignment of the workpiece can be maintained automatically throughout the production run or the life of the grinding wheel, whichever governs.

Referring now more specifically to FIG. 2, 10 there is shown the grinding machine assembly 20 which has mounted thereon the grinding wheel 72, which grinding wheel is used to grind the bars 12 to the requisite diameter. The bar 12 is held in position against the grinding wheel 72 by the regulating wheel 74. The purpose of the regulating wheel is to provide a precise location and support for the bar in order that the grinding wheel may remove the desired amount of material from the bar. Additionally, the regulating wheel serves to spin the bar and, by virtue of the angular depression of its axis relative to that of the bar, to provide through-feed during the grinding action. The regulating wheel is continuously and precisely advanced toward the grinding wheel as the grinding wheel is worn down. The regulating wheel 74 is rotatably mounted on a shaft 76 connected to an upper slide assembly 78 within which is located the regulating wheel drive motor (not shown). The upper slide assembly 78 is slidably mounted on a lower slide assembly 80 which is in turn slidably mounted on the main frame 82 of the grinding machine assembly 20.

The lower slide assembly is continuously biased toward the grinding wheel to insure that the bar is ground to the requisite diameter. To this end, there is provided a control mechanism 84 including a laser dimension sensor (not shown) which measures the diameter of the bar downstream of the grinding wheel. If the bar is oversized, a proportional signal is sent to an electromechanical compensator on the upper slide assembly (not shown) which advances the regulating wheel, workrest and lower slide toward the grinding wheel by an amount equal to the sensed oversize condition. The laser sensor then "waits" an amount of time dependent on the through-feed rate to "see" the results of the last compensation. If the laser senses another oversize condition this cycle is repeated.

The movement of the lower slide assembly 80 is sensed by a linear encoder 85 that is part of the control mechanism 84. The linear encoder 85 is secured to the grinder main frame 82 and attached to the lower slide assembly 80 to sense the movement and position of the lower slide relative to the main frame 82. A workrest 86 for the bar 12 is positioned to resist the downward force created by the grinding wheel and thus essentially stabilize the position of the bar during the grinding action. The workrest 86 is located in a workrest support 88 that is affixed to the lower slide assembly 80. It is to be noted that the regulating wheel is set at a slight angle to provide a vector force to drive the ground bar through the grinding station onto the exit conveyor.

As aforementioned a principle aspect of applicants invention is to provide a system that will compensate for the wearing of the grinding wheel 72 by moving the grinding wheel toward the bar (workpiece) as the grinding wheel wears down. This is necessary to maintain an essentially fixed longitudinal centerline of the bar 12 throughout the grinding action to provide for a centerless grinding system. To accomplish this end, the grinding wheel 72 that is mounted on the main frame is made adjustable by being secured to a movable mounting plate 90 that includes linear roller bearings 92 to support the main support 82 relative to stationary base plate 94. There are guide rails 96 located on the base plate 94 that guide the linear roller bearings 92.

Adjustment of the mounting plate 90 and associated machine frame 82 with grinding wheel 72, is effected by a computer-controlled servomotor 98 that drives a planetary gear reducer that drives the ball screw 100. The servomotor is operated in response to the linear encoder 85 which is connected to the lower slide assembly 80 and thus senses the movement of the regulating wheel 74. This movement is normally the result of the actions of the aforementioned laser/electromechanical compensation system, but may also be the result of manual adjustments that are available to the operator. The linear encoder actuates the servomotor 98 to move the main frame 92 an amount equal to but in the opposite direction to that of the regulating wheel 74. This results in moving the grinding wheel toward the bar an equivalent amount to compensate for the wear on the grinding wheel. The bar moves from the grinding station to the exit conveyor 22. The exit conveyor is of the same design as that of the entry conveyor and a comparable pick-up arm arrangement is used to move bars from the exit conveyor to the holding area.

In addition to using the system for centerless grinding, it may be adapted to any machine tool operation where workpiece support and/or parts loading mechanisms must remain fixed in relation to movable elements of the machine. This includes, but is not limited to drilling, milling, surface grinding, etc.

To have a better understanding of the system, including its method of operation, we offer the following.

During the grinder set-up, a "new" bar is positioned against the grinding wheel at the desired vertical location. To support the bar in this position, the workrest 86 located in the workrest support 88 is adjusted to support the bar as shown in FIG. 2. The workrest support 88 is rigidly fixed to the lower slide assembly 80. There is a vertical adjustment arrangement for the workrest located in the lower slide assembly (not shown). When the workrest 86 is suitably adjusted, the lower slide assembly 80 is locked in position relative to the main support 82. The regulating wheels 74 and its drive motor which are an integral part of the upper slide assembly 78 is laterally adjusted toward the grinding wheel 72 until the regulating wheel 74 contacts the bar 12. The set-up is correct when the regulating wheel is in contact with the bar and the bar is in contact with the grinding wheel. The upper slide assembly 78 is then locked to the lower slide assembly 80 and the lower slide is unlocked from the main frame 82 so that it can be moved relative thereto. Thus, it can be appreciated that at this stage of the initial set up, the upper slide is locked to the lower slide and therefore, as the grinding wheel wears, it is the lower slide that is advanced toward the grinding wheel. The regulating wheel and the workrest, as well as the bar, are all in a fixed relationship and that all are carried by the lower slide and may be considered as a single unit. It is this total unit that is advanced in order to maintain the desired dimensional tolerance and surface finish required of the product.

The foregoing is the initial set-up, and subsequent thereto, an adjustment is made for stock removal. This, of course, will depend upon the desired finished diameter of the bar. The adjustment consists of removing the bar, then advancing the lower slide by the amount of desired stock to be removed from the bar. This creates a new gap between the regulating wheel and grinding wheel which is smaller than the original bar diameter. When the bar is pushed into this new gap the grinding wheel removes the excess stock and a finished product is produced.

The following is the operation during a production run. The lower slide is connected to the linear encoder which encoder body is connected to the grinder main support frame 82. The lower slide 80 is attached to the sensor portion of the encoder by means of a suitable link. During operation, the encoder electronically senses any change in position as well as the location of the lower slide. The electronic control output of the encoder is fed into a computer which processes this signal and then sends a signal to the servomotor 98. The servomotor 98 is then actuated to reposition the entire grinding station in the opposite direction to that of the lower slide movement, hence returning the bar to its original lateral position. The amount of this movement must be exactly the same as the lower slide movement. When the bar leaves the grinding station, it is disposed on the exit conveyor 22 and then moved to the holding area 24.

The movements described above are extremely small. They range from a few ten thousands of an inch to a few one thousands of an inch. Therefore, the actual movement of this machine is virtually continuous and uninterrupted and is not perceptible to the eye. When the bar leaves the grinding station, it is disposed on the exit conveyor 22 and then moved to the holding area 24.

It is to be noted that the undercarriage system can be engaged or disengaged depending on the operation being performed. During set-up the system is normally off and during the production run it is on.

It is intended to cover by the following claims all such modifications and embodiments that fall within the true spirit and scope of the invention.

What is claimed is:

1. An adjustable grinding system for grinding a bar to a predetermined diameter including a main support, a platform movably mounted relative to said main support, a grinding wheel rotatably mounted on said platform, a regulating wheel, means movably mounting said regulating wheel relative to said main support, means for biasing said regulating wheel against the bar into contact with the grinding wheel, means for sensing the diameter of the bar being ground and means responsive to said sensing means and movement of the regulating wheel to move the grinding wheel to insure proper grinding of the bar.

2. An adjustable grinding system as set forth in claim 1 in which the sensing means includes a control mechanism for sensing movement of the regulating wheel during the grinding action and means for moving the grinding wheel platform in response to movement of said regulating wheel.

3. An adjustable grinding system as set forth in claim 2 including a servomotor responsive to a signal from said regulating wheel sensing device for moving the platform on which the grinding wheel is located.

4. An adjustable grinding system as set forth in claim 2 in which the control mechanism includes an encoder mechanism that includes a laser device that senses the diameter of the bar and the movement of the regulating wheel.

5. An adjustable grinding system as set forth in claim 2 in which the control mechanism includes a computer system that senses the movement of the regulating wheel and sends a signal to a servomotor that moves the platform on which the grinding wheel is located an amount equal to that of the regulating wheel in the opposite direction to that of the regulating wheel to grind the bar to its predetermined diameter.

6. An adjustable grinding system as set forth in claim 5 in which the control system is designed so that very small movements of the regulating wheel result in essentially immediate comparable movements of the grinding wheel whereby movement of the regulating wheel and grinding wheel is virtually continuous and uninterrupted and not perceivable to the eye.

* * * * *